G. HUNTER.
SPRING WHEEL.
APPLICATION FILED JULY 11, 1916.
1,229,618.
Patented June 12, 1917.
2 SHEETS—SHEET 1.
Fig.1.
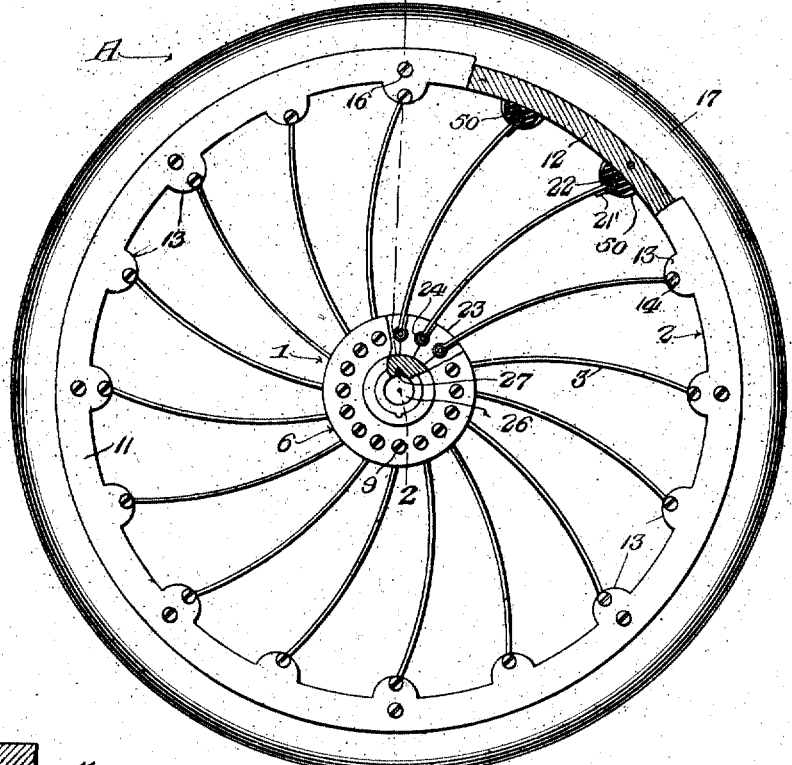
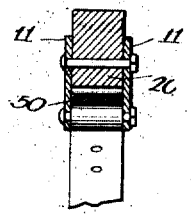
Fig.10.
Fig.3.
Witness
J H Crawford
Inventor
Guy Hunter,
By Victor J. Evans
Attorney G. HUNTER.
SPRING WHEEL.
APPLICATION FILED JULY 11, 1916.
1,229,618.
Patented June 12, 1917.
2 SHEETS—SHEET 2.
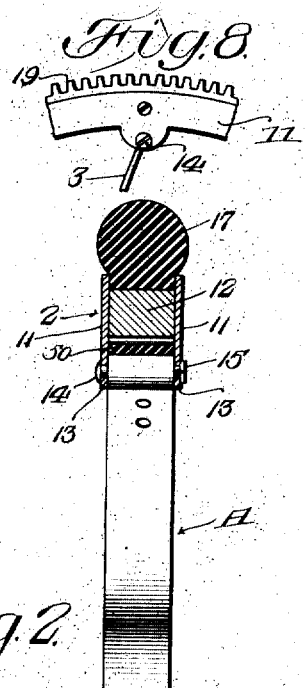
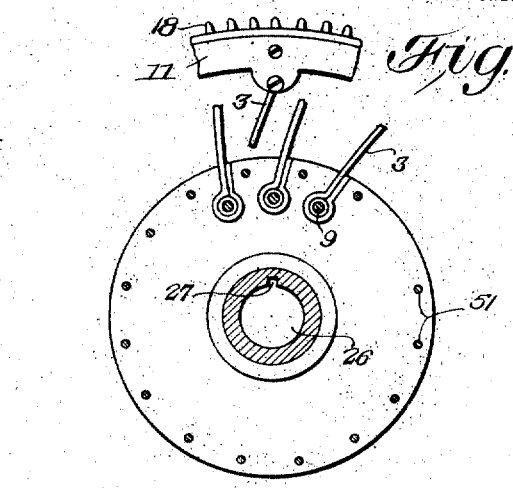
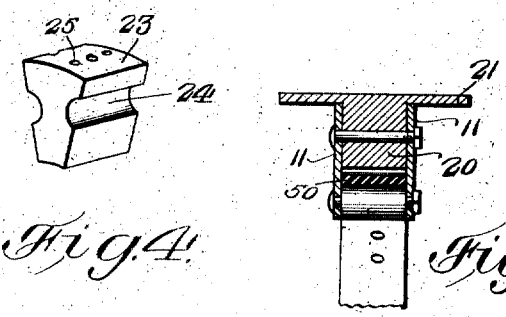
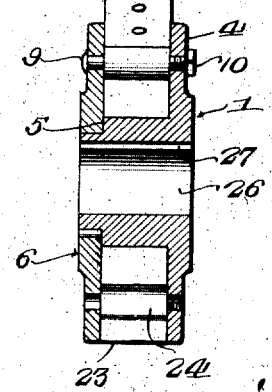
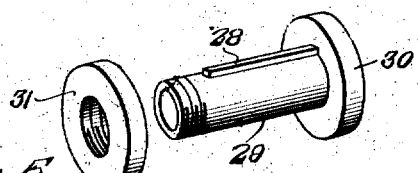
Witness
J. H. Crawford
Inventor
Guy Hunter,
By Victor J. Evans
Attorney

UNITED STATES PATENT OFFICE.

GUY HUNTER, OF BILLINGS, MONTANA.

SPRING-WHEEL.

1,229,618.　　　Specification of Letters Patent.　　Patented June 12, 1917.

Application filed July 11, 1916. Serial No. 108,672.

*To all whom it may concern:*

Be it known that I, GUY HUNTER, a citizen of the United States, residing at Billings, in the county of Yellowstone and State of Montana, have invented new and useful Improvements in Spring-Wheels, of which the following is a specification.

This invention relates to improvements in the construction of spring spoke wheels.

In carrying out my invention it is my purpose to provide a wheel having spring spokes wherein the opposite ends of said spokes are looped upon themselves and metal sleeves arranged within the loops through which sleeves pass the bolts that connect the spokes to the hub and to the rim of the wheel, and thereby relieve the ends of the spokes from unnecessary strain and prolong the life of the same.

It is also my purpose to construct a spring spoke wheel having a hub of a novel construction whereby a reduced spindle may be arranged therethrough and secured thereon so as to accommodate the wheels to various sizes of axles, spindles, shafts or the like.

A further object of the invention is to produce a spring spoke wheel having the hub thereof provided with an annular flange upon one of its sides and a hub cap for the opposite side, to arrange between the flange and the hub cap the inner looped ends of the spring spokes, and to employ the elements connecting the spokes for also connecting the flange of the hub and the hub cap and to further arrange between the flange and hub cap and to the opposite sides of the spokes rubber block or filler members which in addition to supporting the said inner ends of the spokes will absorb a part of the strain or shock imparted to the said spokes and also prevent rattling and wear of the parts at the hub portion of the wheel.

It is a still further object of the invention to produce a spring spoke wheel having a rim comprised of flat side members and an inner or filler member, the side members being provided with inturned lugs through which pass bolts that engage with the outer ends of the spring spokes and the construction being such as to permit of a tread member being arranged between the sides and on the filler member or whereby a toothed member may be arranged upon the filler member between the side flanges and secured thereto or further whereby a peripheral flanged member may be arranged upon the rim and over the sides, so that the device may be employed either as a spring wheel, a gear or a pulley.

With the above and other objects in view the improvement resides in the construction, combination and arrangement of parts set forth in the following specification and falling within the scope of the appended claims.

In the drawings:

Figure 1 is a side elevation of a wheel constructed in accordance with the present invention, a portion of the rim and a portion of the hub being broken away and parts being shown in section, Fig. 2 is an enlarged detail sectional view approximately on the line 2—2 of Fig. 1, Fig. 3 is an enlarged edge view of one of the spokes, Fig. 4 is a perspective view of one of the hard rubber block members employed in the construction of the hub, Fig. 5 is a perspective view of the reducing spindle for the hub and the cap member therefor, Fig. 6 is a detail transverse sectional view through the rim illustrating the arrangement of the rubber block member between the ears of the side members of the ring and also illustrating the filler member as provided with a lateral flange whereby the wheel is converted into a pulley, Fig. 7 is a cross sectional view through the hub of the wheel showing the arrangement of some of the spokes therein before the compressible block members are arranged upon the hub and between the spokes, Fig. 8 is a fragmentary elevation of the rim illustrating the arrangement of peripheral teeth thereon, Fig. 9 is a similar view illustrating the relation of the spur teeth upon the periphery of the wheel, and Fig. 10 is a detail fragmentary sectional view illustrating the filler member projecting through the side members of the ring.

Referring now to the drawings in detail, the wheel is broadly indicated by the character A and includes a hub 1, rim or felly 2, and bowed resilient spring steel spokes 3 between the hub and rim and connected to the said hub and rim, the said spokes being arranged tangentially as clearly shown by the drawings. The hub 1, upon one of its sides or faces is formed with an annular flange 4 while its opposite end is reduced providing the same with a shoulder 5. The numeral 6 designates the hub cap which is adapted to surround the reduced extension of the hub and to rest upon the shoulder 5. The hub cap is of a size corresponding to that of the flange 4 and both of these elements are provided with transversely arranged alining openings for the reception of connecting bolts 9 that are provided with securing nuts 10.

The rim or felly 2 includes side members 11, each comprising a ring or annulus and disposed between the said side members is an annular inner or filler member 12 which may, if desired, project beyond the periphery of the side members 11 to form the tread for the wheel. The side members 11 are flat in cross section and have their inner peripheries at spaced intervals formed with inwardly extending ears 13, the ears of one of the members 11 being disposed opposite the ears of the other member and the alining ears being provided with openings through which are passed bolts 14 having securing nuts 15. The side members 11, at determined intervals, are provided with registering openings through which pass securing elements 16 that retain the inner or filler member 12 between the said elements. As disclosed in Fig. 2 of the drawings the filler member may be arranged inwardly of the outer peripheral edges of the side members 11 and may receive therebetween and have secured thereto a tread member 17 which may be in the nature of a solid tire or in the nature of a pneumatic tire, or the said side members may have arranged therebetween a ring provided with spur teeth 18 (see Fig. 9) or a ring provided with gear teeth 19 (see Fig. 8). By this arrangement it will be noted that the wheel may be used in a number of capacities, and in addition to the tread 17, spur teeth 18 or gear 19 the said side members may have arranged therebetween and secured thereto the central rib 20 of an annulus 21, as shown in Fig. 6 so that the wheel may be used as a pulley to receive a belt if desired.

The tangentially arranged spring spokes 3 have both of their ends looped upon themselves and secured to the said spoke proper, as indicated by the numeral 21', and within each of these loops is arranged a cylindrical bearing 22 through which the bolts 9 and 14 pass so that the bolts do not contact directly with the looped ends of the said spokes and also whereby the ends of the said spokes are relieved from unnecessary friction and the life of the spokes consequently prolonged.

It will be noted that each of the spokes has one of its ends arranged between a registering pair of the spaced ears 13 of the side members 11 of the rim or felly and their opposite ends between the flange 4 and cap plate 6 of the hub 1, and to reinforce and strengthen the ends of said spokes, to add to the resiliency thereof and to cushion the same to prevent rattling incident to the shock and jar to which the same are subjected, I provide block members of hardened rubber. The block members for the ends of the spokes in the hub are of a size to be snugly received between the flange 4 of the hub and the inner face of the hub cap 6. These blocks are illustrated in detail in Fig. 4 of the drawings, and are each of a size to be snugly received between and contact with the confronting sides of the said ends of the spokes 3. To accommodate the rounded ends of the spokes, each of the blocks 23 is grooved transversely, as at 24, and to add to the resiliency of the said blocks I provide the same with centrally disposed radially extending apertures 25. In some instances only a single aperture is required, but, of course, I am not to be restricted to any number, the functions of the said apertures being, as stated, merely to add to the resiliency of the cushion blocks. The cushion blocks 23 are of course substantially wedge-shaped in plan and the engagement of the grooves 24 with the rounded ends of the spokes will effectively retain the said cushion blocks between the flange 4 and cap 6 of the hub.

The cushion blocks for the outer ends of the springs 3 or the ends thereof received between the ears 13 of the side members 11 of the rim or tread are indicated by the character 50 and are best illustrated in Figs. 1, 2 and 6. These cushion blocks 50 are shaped to be snugly received between the ears 13 and have their inner rounded faces each provided with a transverse slot conforming to the outer rounded or looped end of the spokes 3, and are adapted to receive the said ends of the said spokes. The peculiar formation of the cushioning blocks 50 permit of the same being retained between the ears of the side members of the rim by the contact between the same and the ends of the spokes 3.

The bore 26 of the hub 1 communicates with a transversely arranged groove 27 and this groove is adapted to receive a longitudinally arranged spline or tongue 28 provided upon a reduced spindle 29. The spindle has one of its ends flanged or provided with a head 30 and its opposite end is threaded, whereby to receive an interiorly threaded cap member 31. The bore of the reducing sleeve may be provided with a transversely arranged slot, similar to the slot 27, and whereby a number of reducing sleeves may be arranged one within the other and connected one with the other and all with the hub, so that the device may be received upon shafts of varying cross sectional diameters or upon axle spindles of different diameters, while still again, reducing spindles having various sized bores may be employed as will, it is thought, be readily understood.

From the above description, taken in connection with the accompanying drawing, the simplicity of the device, as well as the advantages thereof will, it is thought, be perfectly apparent to those skilled in the art to which such invention appertains without further detailed description.

Having thus described the invention, what I claim is:

1. A wheel including a hub, tangentially arranged spring spokes and a rim, said hub comprising a member having a flange at one of its ends, a cap secured to its other end, the spokes having their opposite ends bent to provide loops and said loops being connected with the spokes proper, a tubular member in each of the loops, the inner ends of the spokes adapted to be received between the flange of the hub and the cap of said hub, means passing through the said cap and said hub and through the tubular members upon the said inner ends of the spokes for securing the spokes to the hub, flexible cushion blocks disposed between the flange and the cap of the hub and contacting with the spokes, the rim comprising a plurality of connected sections, and means, passing through the outer sections and through the tubular members in the outer ends of the spokes for securing the spokes to the rim.

2. A wheel including a hub, a rim and spring spokes between the hub and rim, said rim comprising side members and a filler member between the sides, spaced alining ears upon the inner edge of the rim, the spokes being disposed tangentially between the rim and the hub and having their ends rounded, roller members within the rounded ends of the spokes, bolts passing through the roller members for connecting the spokes to the hub and to the rim, and compressible members disposed between the ears of the side members of the rim and receiving the ends of the spokes.

In testimony whereof I affix my signature.

GUY HUNTER.